April 6, 1926.
W. A. LOKE
ELECTRIC FURNACE AND THE LIKE
Filed June 2, 1925
1,580,060
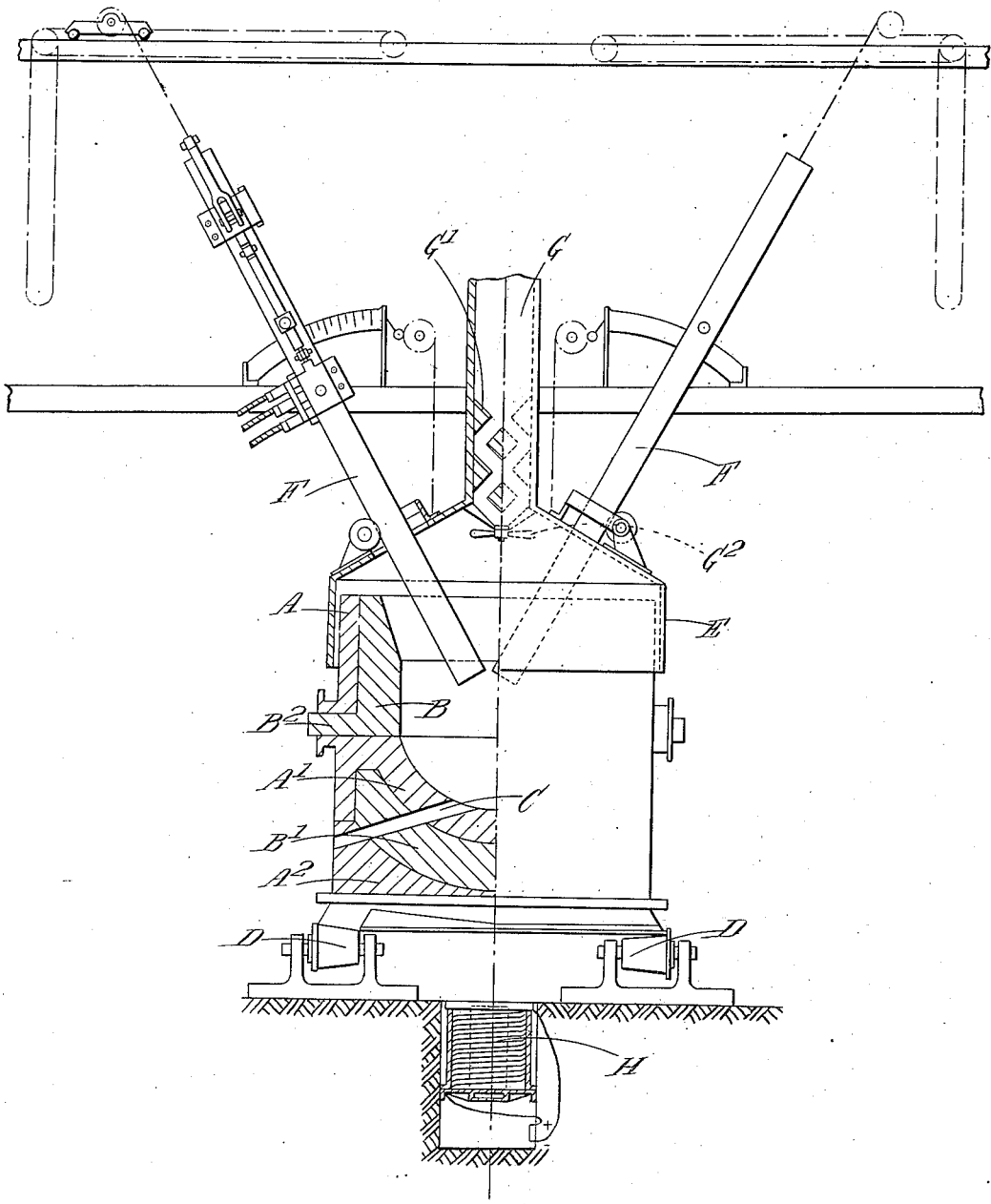

Patented Apr. 6, 1926.

1,580,060

UNITED STATES PATENT OFFICE.

WILLIAM ALEXANDER LOKE, OF LAMBETH, ENGLAND.

ELECTRIC FURNACE AND THE LIKE.

Application filed June 2, 1925. Serial No. 34,385.

*To all whom it may concern:*

Be it known that I, WILLIAM ALEXANDER LOKE, a subject of the Queen of the Netherlands, residing at 183 Westminster Bridge Road, Lambeth, in the county of London, England, have invented certain new and useful Improvements in or Relating to Electric Furnaces and the like, of which the following is a specification.

This invention relates to electric furnaces and the like, the chief object of the invention being to reduce the consumption of current and to produce a denser product than heretofore; a further object of the invention is to produce a construction of furnace which is specially adapted for the treatment of finely divided ores, such as iron sand, titaniferous iron ores or the like.

During the reduction of metallic ores in electric furnaces it is customary to locate the reducing agent, together with a flux, upon the surface of the ore. Owing to this fact, and before the reducing agent, which is usually carbon, charcoal or a carbide, has completed the reducing process, it rises owing to its specific gravity, to the top of the bath, and floats upon the surface of the molten flux. Consequently, and as the reducing agent is separated from the ore by a layer of molten flux the process of reduction has necessarily to be prolonged so as completely to reduce the ore. The consumption of electric current is therefore high, and the cost of producing the metal is increased.

According to one feature of the present invention and in addition to, or in lieu of, locating the reducing agent on the top of the bath, the interior wall of the furnace which comes into contact with the ore, is composed of, or lined with, a suitable reducing agent such as carbon, charcoal, graphite or a carbide. Owing to this fact the ore is acted upon by the reducing agent more expeditiously than heretofore, thus reducing the consumption of current by shortening the time required for reducing the ore. In order to facilitate the ore being brought into contact with the reducing agent which lines the furnace, the latter is preferably adapted to be revolved at a suitable speed, thus causing the larger or heavier portions, or the mass or masses of ore, to move outwards towards the periphery of the bath or molten or semi-molten material and to be brought into intimate contact with the reducing agent. The operation of revolving the furnace, which may be effected in any suitable manner, also has the effect of concentrating the metal by causing the smaller particles to collide and collect into larger masses which sink at once to the bottom of the furnace, thus producing a denser product and assisting in diminishing the time required to reduce the ore.

The aforesaid lining of reducing material is preferably only located around the top portion of the bath so that the metal when it separates and sinks to the bottom of the furnace is no longer in contact therewith. The metal is thus prevented from taking up an undue portion of carbon, which, in the case of iron ores, would have the effect of converting the metal from steel into pig-iron. The space at the bottom of the furnace in which the molten metal collects may be so proportioned as to accommodate the total amount of metal produced from any given batch of ore, or a draw hole or holes may be provided immediately below the lining of reducing material so that the molten metal can be withdrawn when it reaches the level of the draw holes.

The process may be carried on in a furnace adapted either for arc or resistance heating or both, and the lower portion of the furnace, within which the metal collects, may be made from or lined with magnesite, zirconia, or any other heat resisting material which does not contain carbon.

For the sake of lightness and where magnesite or other heavy refractory material is used, the layer of magnesite or the like at the bottom of the bath may be covered externally with a layer of carbon or other light material. The internal lining of carbon or the like, may project through the walls of the furnace to the exterior thereof so as to provide extensions to which electric conductors may be attached, or, alternatively, the extensions may be surrounded by a copper ring to which the conductors are clamped. Consequently, the carbon lining may also be employed for resistance heating of the furnace or for combined resistance and arc heating in cases where internal electrodes are used.

Instead of employing a continuous lining of reducing material, the reducing material may be in the form of plugs, bricks or the like inserted in or attached to the interior wall of the furnace.

According to another feature of the present invention and with the object of further increasing the speed of reduction and thereby reducing the consumption of electrical energy in an electric arc furnace, the material is fed in a finely divided condition through the heating arcs. To this end, the ore which is to be reduced, if not already in a finely divided state as in the case of iron sand, is subjected to a preliminary crushing operation so as to reduce it to particles of small dimensions, and these particles are fed or allowed to fall by gravity through the electric heating arcs thus undergoing intense heating before reaching the bath. The reducing agent or a quantity thereof may also be fed in simultaneously with the finely divided material so that the smaller particles will melt at once and the metal sink immediately to the bottom of the furnace. A rotating propeller or some equivalent device may be provided to assist in this action so that the finely divided material is spread out or showered through the arcs, thus increasing the heating or melting effect. If desired, one or more sets of superimposed arcs may be provided, the upper set being, for example, adapted to impart a preliminary heating or melting acting on the finely divided material, and the lower arcs being adapted to act upon the surface of the bath.

According to a further feature of the present invention, an electro-magnet is provided and located below the bottom of the furnace so as to deflect and draw down the arc or arcs onto the surface of the bath.

The magnet also serves to attract the particles of metal as they separate from the slag, especially the smaller particles which do not tend to sink readily by gravity to the bottom of the bath, thus increasing the speed of reduction and assisting in the production of a dense metal. The use of a magnet for this latter purpose is not restricted to arc furnaces but is also applicable to resistance furnaces or to combined arc and resistance furnaces and especially furnaces for the treatment of finely divided ores.

In order that the said invention may be clearly understood and readily carried into effect the same will now be described more fully with reference to the accompanying drawing which shows a part sectional elevation of an electric furnace, more particularly adapted for the reduction of finely divided ores, such as iron sand or titaniferous iron ore.

A is the body portion of the furnace certain portions $A'$ and $A^2$ being composed of a heat resisting material, such as magnesite or zirconia. B is the lining of reducing material, such as carbon, graphite, charcoal or carbide which is located at the upper portion of the bath. $A'$ is the refractory material at the bottom of the bath which is provided for the purpose of preventing the metal after it has been reduced from taking up an undue proportion of carbon. $B'$ is a layer of carbon or other material located externally of the layer $A'$ of refractory material at the bottom of the bath, said layer of carbon or the like being provided for the sake of lightness. The internal lining B of carbon or the like projects through the walls of the furnace as shown so as to provide extensions $B^2$ to which electric conductors can be attached. Such extensions may, if desired, be surrounded by a copper ring to which the electric conductors are clamped. C is a draw hole located at the bottom of the furnace for withdrawing the molten metal from the furnace. The furnace is mounted upon rollers D, D and is adapted to be revolved at a suitable speed by means of an electric motor or otherwise so as to assist in concentrating the molten metal by throwing the unreduced portions towards the periphery of the bath, thus bringing the same into more intimate contact with the carbon lining, while at the same time assisting in concentrating the reduced portions of the ores. E is a stationary or roof or cover, which may be water cooled, and F, F are two pairs of electrodes composed of carbon or the like which are adjustably mounted on rollers in the roof of the furnace. The adjustable mechanism shown is such that the arcs can not only be raised or lowered without the admission of air but the relative position of the lower ends of the electrodes between which the arcs are formed can also be simultaneously adjusted. G is a tube connected to the roof of the furnace through which the powdered ore which is to undergo treatment is adapted to be fed by gravity or otherwise from a suitable reservoir. The tube G is provided internally with projections $G'$, $G'$ which retard the flow of the finely divided ore, while at the same time assisting in showering the same through the arcs. $G^2$ is a propeller which is rotated from any suitable source of power which also assists in showering the finely divided material through the electric arcs. The aforesaid method of feeding the ores in powdered form through the heating arcs also has the advantage that it prevents the admission of air during the charging operation. Consequently the reducing atmosphere is not interfered with. When a full charge of material has been fed to the furnace the tube G can be closed so as to prevent the escape of heat.

In operation the finely divided ores are fed from a suitable reservoir down the tube G where their speed is reduced before entering the furnace by the projections $G'$;

thereafter the propeller G² spreads out or showers the material so that it falls in the form of a thin stream through the two arcs formed by the two pairs of electrodes situated below. It will be observed that the electrodes are displaced eccentrically with regard to the axis of the furnace so that as the furnace revolves the arcs sweep the entire surface of the bath thus distributing the heat in a more effective manner than heretofore. H is a magnet located at the bottom of the bath for the purpose of attracting the arcs towards the surface of the bath.

By means of the present invention finely divided ores are reduced very expeditiously and efficiently. Furthermore, the electric furnace has the advantage that it enables steel to be obtained in a single operation directly from its ores, in contradistinction to older processes where pig-iron was first produced and steel thereafter formed by a second and separate operation.

It will be obvious that instead of providing mechanical means for producing relative movement between the molten material constituting the bath and the heating arc or arcs, electromagnetic means may be provided for effecting the same result, and that such electro-magnetic means may serve the double purpose both of producing relative movement between the molten material constituting the bath and the heating arc or arcs and also drawing down the heating arcs themselves onto the surface of the bath.

What I claim and desire to secure by Letters Patent of the United States is:—

In a device of the class described, the combination of a revoluble furnace having portions thereof composed of heat resisting material and a lining of reducing material, said lining having outwardly projecting extensions, means for attaching electric conductors to said extensions, means for revolving said furnace, a stationary cover fitting said furnace and having inclined openings in the top thereof and a delivery tube projecting centrally therefrom, means in said cover for feeding material in a finely divided condition to the furnace, electrodes extending through said openings and positioned so that the arcs are disposed eccentrically relative to the vertical axis of the furnace, and an electro-magnet associated with the furnace whereby the heating arcs are drawn down on the surface of the molten material constituting the bath and produce relative movement between the bath and the arcs so that the eccentrically disposed arcs are caused to sweep over a considerable area of the bath while the molten material is brought into contact with the reducing agent and simultaneously concentrated to effect a more uniform distribution of heat over the surface of the bath.

WILLIAM ALEXANDER LOKE.